US011958496B2

(12) United States Patent
Gläser et al.

(10) Patent No.: US 11,958,496 B2
(45) Date of Patent: Apr. 16, 2024

(54) DRIVING INTENTION RECOGNITION (71) Applicant: Volkswagen Aktiengesellschaft, Wolfsburg (DE)

(72) Inventors: Stefan Gläser, Braunschweig (DE); Monique Engel, Knesebeck (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 167 days.

(21) Appl. No.: 17/715,797

(22) Filed: Apr. 7, 2022

(65) Prior Publication Data

US 2022/0324473 A1 Oct. 13, 2022

(30) Foreign Application Priority Data

Apr. 9, 2021 (DE) ...................... 10 2021 203 551.5

(51) Int. Cl.
*B60W 50/14* (2020.01)
*B60K 35/00* (2006.01)
(Continued)

(52) U.S. Cl.
CPC ............. *B60W 50/14* (2013.01); *B60K 35/00* (2013.01); *B60W 30/18163* (2013.01);
(Continued)

(58) Field of Classification Search
CPC ........... B60W 50/14; B60W 30/18163; B60W 40/04; B60W 50/10; B60W 2050/146;
(Continued)

(56) References Cited

U.S. PATENT DOCUMENTS 9,387,813 B1 * 7/2016 Moeller ................. B60R 11/04
9,682,708 B2 6/2017 Maruyama
(Continued)

FOREIGN PATENT DOCUMENTS

DE 102014201282 A1 7/2015 ............ B60W 50/08
DE 102015115360 A1 3/2016 ............ B60W 30/12
(Continued)

OTHER PUBLICATIONS

German Office Action, Application No. 102021203551.5, 7 pages, dated Dec. 9, 2021.

*Primary Examiner* — Chico A Foxx
(74) *Attorney, Agent, or Firm* — Slayden Grubert Beard PLLC (57) ABSTRACT The disclosure relates to a device for recognizing an intention of a driver for a lane change assistant in an at least partially autonomous motor vehicle, a corresponding system, and a method and computer program. It is provided that steering of a driver does not directly cause lateral acceleration, as is currently the case, but rather serves the vehicle as an input medium for the intention of the driver to imminently initiate lateral acceleration, for example a turn-off procedure or a change of travel lane. As a result of the signal from the control element, a safe, drivable trajectory that will subsequently be traveled automatically by the vehicle is calculated. This may also include more complex driving maneuvers, such as a change of multiple travel lanes. As a result, driving is made more convenient and safer.

20 Claims, 5 Drawing Sheets (51) Int. Cl.
  *B60W 30/18* (2012.01)
  *B60W 40/04* (2006.01)
  *B60W 50/10* (2012.01)
  *G06V 20/56* (2022.01)
  *B60K 35/10* (2024.01)
  *B60K 35/23* (2024.01)
  *B60K 35/28* (2024.01)
  *B60K 35/29* (2024.01)

(52) U.S. Cl.
  CPC ............ *B60W 40/04* (2013.01); *B60W 50/10* (2013.01); *G06V 20/56* (2022.01); *B60K 35/10* (2024.01); *B60K 35/23* (2024.01); *B60K 35/28* (2024.01); *B60K 35/29* (2024.01); *B60K 2360/176* (2024.01); *B60K 2360/177* (2024.01); *B60K 2360/1868* (2024.01); *B60W 2050/146* (2013.01); *B60W 2420/403* (2013.01)

(58) Field of Classification Search
  CPC ... B60W 2420/42; G60V 20/56; B60K 35/00; B60K 2370/1529; B60K 2370/177; B60K 2370/12; B60K 2370/176; B60K 2370/193; B60K 2370/1868
  See application file for complete search history.

(56) References Cited

U.S. PATENT DOCUMENTS

| | | | |
|---|---|---|---|
| 10,328,973 | B2 | 6/2019 | Chan |
| 10,788,822 | B2 | 9/2020 | Mathe et al. |
| 11,766,937 | B2 * | 9/2023 | Nakao ................... G06T 19/006 345/592 |
| 2016/0052394 | A1 * | 2/2016 | Yamada ................. B60K 37/04 701/93 |
| 2017/0243491 | A1 * | 8/2017 | Fujii ...................... G08G 1/167 |
| 2017/0297578 | A1 | 10/2017 | Braun |
| 2018/0208212 | A1 | 7/2018 | Suessenguth et al. |
| 2018/0251155 | A1 * | 9/2018 | Chan ..................... B62D 15/029 |
| 2019/0033855 | A1 * | 1/2019 | Mathe ................... B60W 50/10 |
| 2019/0375430 | A1 * | 12/2019 | Emura ............. B60W 30/0956 |
| 2020/0080863 | A1 * | 3/2020 | Ichinokawa ....... G01C 21/3655 |
| 2020/0231145 | A1 * | 7/2020 | Song ..................... B60W 50/14 |
| 2020/0307691 | A1 * | 10/2020 | Kalabic ................ B62D 15/025 |
| 2020/0369281 | A1 * | 11/2020 | Sato ............... B60W 30/18163 |
| 2022/0073098 | A1 * | 3/2022 | D'Orazio ............. B60W 50/14 |
| 2022/0203834 | A1 * | 6/2022 | Nakao ................. G02B 27/0101 |
| 2023/0286527 | A1 * | 9/2023 | Emura ................. G05D 1/0214 701/26 |
| 2023/0311869 | A1 * | 10/2023 | Kato ....................... B60Q 1/34 701/41 |

FOREIGN PATENT DOCUMENTS

| | | | |
|---|---|---|---|
| DE | 102014220758 A1 | 4/2016 | ............ B60W 30/08 |
| DE | 102015204591 A1 | 9/2016 | ............ B60K 20/02 |
| DE | 102016211646 A1 | 12/2017 | ............ B60K 35/00 |
| DE | 102018104801 A1 | 9/2018 | ............ B60W 30/12 |
| DE | 102017212992 A1 | 1/2019 | ............ B60W 50/08 |
| DE | 102019202580 A1 | 8/2020 | ............ B60W 50/14 |
| EP | 3180221 B1 | 10/2018 | ............ B60K 28/06 |
| WO | 2013/117323 A1 | 8/2013 | ............ B60K 26/00 |
| WO | 2017/050477 A1 | 3/2017 | ............ B60W 30/06 |

* cited by examiner

DRIVING INTENTION RECOGNITION

CROSS-REFERENCE TO RELATED APPLICATIONS

This application claims priority to German Patent Application No. DE 10 2021 203 551.5, filed on Apr. 9, 2021 with the German Patent and Trademark Office. The contents of the aforesaid patent application are incorporated herein for all purposes.

TECHNICAL FIELD

The invention relates to a device for recognizing an intention of a driver for a lane change assistant in an at least partially autonomous motor vehicle, a corresponding system, and a method and computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The increasing automation of the driving function is making it possible to choose various modes. In the case of highly automated driving, the driver merely provides tactical instructions such as "turn right", "turn left", etc., and the vehicle performs the operative control itself in a safe and convenient manner. In a classic mode, the driver retains the operative driving task, as before. It is possible to switch between the modes, depending on the driving situation, requirements, and/or the desire of the driver.

SUMMARY

A need exists for an improved processing of an intention of a driver. The need is addressed by the subject matter of the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a device for recognizing an intention of a driver for a lane change assistant in an at least partially autonomous motor vehicle is provided, comprising:
  an input interface for receiving sensor data with information on a section of a roadway in the surroundings of the motor vehicle and control data with information on a control input of a driver of the motor vehicle;
  an analysis circuit for determining a traffic situation in the surroundings of the motor vehicle based on the sensor data and for generating a control command based on the control data in order to control a vehicle unit of the motor vehicle;
  an output interface for transmitting the control command to the vehicle unit of the motor vehicle, wherein the control command prompts a control procedure of the motor vehicle with a vehicle unit in the form of a driver assistance system based on the control input of the driver and prompts depiction of a notice relating to the control procedure of the motor vehicle with a vehicle unit in the form of a display device, wherein the control input corresponds to a control input during manual driving at least in sections.

In some embodiments, a system for recognizing an intention of a driver for a lane change assistant in an at least partially autonomous motor vehicle is provided, comprising:
  a device for recognizing an intention of a driver as discussed herein;
  an AR display device, for example a head-up display on the motor vehicle, for outputting a notice and/or another notice in response to a control command of the device, and
  a driver assistance system for controlling the motor vehicle in response to a control command of the device.

In some embodiments, a method for recognizing an intention of a driver for a lane change assistant in an at least partially autonomous motor vehicle is provided, comprising the steps of:
  receiving sensor data with information on a section of a roadway in the surroundings of the motor vehicle and control data with information on a control input of a driver of the motor vehicle;
  determining a traffic situation in the surroundings of the motor vehicle based on the sensor data;
  generating a control command based on the control data in order to control a vehicle unit of the motor vehicle; and transmitting the control command to the vehicle unit of the motor vehicle, wherein the control command prompts a control procedure of the motor vehicle with a vehicle unit in the form of a driver assistance system based on the control input of the driver and prompts depiction of a notice relating to the control procedure of the motor vehicle with a vehicle unit in the form of a display device, wherein the control input corresponds to a control input during manual driving at least in sections.

By means of an input interface, a cost-efficient device may be created that for example may be used with available systems, modules and units installed in the motor vehicle. An input interface may be designed to be wired and/or wireless, and may for example support one or more communication protocols. By means of an analysis circuit, a beneficial control procedure may be determined for the motor vehicle, wherein a request of the driver is only fulfilled if the traffic situation permits it. By determining a traffic situation in the surroundings of the motor vehicle, safe control of the motor vehicle by means of the driver assistance system may take place. For example, the traffic situation may comprise recognizing the passable lanes. Safety in road traffic is increased. An output interface enables a cost-effective device that may for example be used with available output devices. By using an input interface for receiving data, a technically simple and economical device may be created that, for example, does not itself have to comprise a sensor. Accordingly, the device may be integrated in already existing navigation or infotainment systems. By means of an output interface, components already installed in the motor vehicle may be used for displaying. It is furthermore conceivable to retrofit an AR display device and/or use several AR display devices in combination. Due to the fact that the control input corresponds to a control input during manual driving at least in sections, the driver may convey their intention intuitively as if they were controlling the motor vehicle themselves. The driver does not have to be trained. In addition, by depicting a notice relating to the control procedure of the motor vehicle, the control procedure of the motor vehicle may be monitored in a simple, fast and safe manner by the driver. It should be understood that the device is for example used in a motor vehicle having steer-by-wire technology, and therefore the steering deflection does not directly result in lateral acceleration. For example, indirect steering of the motor vehicle may be assumed, wherein lateral control takes place in a purely electronic manner on the basis of control signals from, for example, the steering wheel or other control elements, such as the turn signal lever. This kind of setup is found, for example, in vehicles with a higher level of automation, in which the operative driving task is increasingly pushed into the background and, for example, tactical driving maneuvers are performed instead. The approach described here makes it possible, on the one hand, to preserve the classic control elements but to use them for more abstract, for example tactical, driving commands when required, and additionally makes it possible to intuitively switch between different automation levels in the same motor vehicle. The use of conventional control elements such as the steering wheel and turn signal lever makes it possible, for example upon request, for example depending on the driver or driving situation, to switch between the modes "operative control", i.e., active control of the motor vehicle by the driver, and "tactical control", i.e., control of the motor vehicle by a driver assistance system in response to an instruction/request of the driver.

Some embodiments provide that the output interface is designed to transmit the control command to an AR display device, e.g., in the form of an AR HUD, and is for example designed to be installed in a motor vehicle, for example as part of an onboard computer, infotainment system, and/or navigation system. As a result, the driver may select a configuration that is understandable for himself. The acceptance, the convenience and the understandability of the system may be improved and enhanced. A control command for an AR HUD enables improved visualization of the information for a driver. For example, a driver may direct their sight toward the roadway and does not have to look at an additional display in the motor vehicle. Safety in road traffic is increased.

Some embodiments provide that the analysis circuit determines a control command that prompts depiction of a notice for displaying a travel lane traveled on by the motor vehicle, for example by locating the notice using augmented reality. As a result, the current state may be easily detected by the driver. By locating the notice, the travel lane currently being traveled on may be recognized by the driver in an improved manner. For example in an at least partially autonomous driving mode, in which concentration of the driver may be reduced, a quick estimation of the current state by the driver is possible.

Some embodiments provide that the input interface is designed to receive control data from a steering wheel, turn signal lever, joystick and/or actuation switch, and the control procedure comprises turning off and/or changing lane. As a result, a request of the driver may be detected by means of known operational inputs and control elements in an at least partially autonomous driving mode. The driver may also control the vehicle with the usual operational inputs in the at least partially autonomous driving mode. The acceptance and convenience are increased. For example, as already known in principle in the prior art, a first and a second joystick may be used in a steer-by-wire vehicle.

Some embodiments provide that the analysis circuit determines a control command that, in response to a control input of the driver, prompts depiction of another notice with information on a control procedure to be performed by the driver assistance system according to the control command, for example by locating the other notice using augmented reality. As a result, fast and efficient monitoring of the control procedure to be performed may take place on the part of the driver. Furthermore, the level of convenience may be increased since the driver determines the driving maneuver based on a notice for example located in the surroundings. The driver may keep their gaze directed at the street during the selection. Safety in road traffic is increased.

Some embodiments provide that the input interface is designed to receive control data that comprise a confirmation, by means of a confirmation switch, of the control procedure to be performed by the driver assistance system according to the control command, wherein the control command prompts the control procedure to be performed after confirmation has been received. As a result, the control procedure to be performed may be determined in an improved manner. For example, by receiving confirmation, unnecessary calculation of control data may be prevented. The confirmation may, for example, take place by means of the confirmation switch being pressed or by means of an acoustic command from the driver. It should be understood that the confirmation switch may then comprise circuitry and a microphone. For example, calculation of the control parameters for at least partially autonomous driving of the motor vehicle is only started when the control procedure to be performed has been confirmed. It should be understood that the analysis circuit may only initially output one control command for the notice and then determines an additional control command for the driver assistance system in response to receiving the confirmation.

Some embodiments provide that the input interface is designed to receive control data in the form of abort data with information on cancellation of the control procedure to be performed according to the control command, wherein the abort data comprise, for example, counter-rotation of the steering wheel, counter-control by means of the joystick, haptic inputs, and/or acoustic inputs by the driver. As a result, safety and convenience may be increased, since incorrect inputs may be corrected or, alternatively, aborted quickly and intuitively. It should be understood that the analysis circuit may determine a new control command after receiving the abort data, wherein the control procedure to be performed according to the control command comprises remaining and traveling on the travel lane currently being traveled on.

Some embodiments result from the other features specified in the dependent claims.

The various embodiments mentioned herein may be combined with one another, unless noted otherwise in individual cases.

"Steer-by-wire" in the context of the present teachings is understood as, in particular, a system in vehicle technology in which a steering command is forwarded in an exclusively electrical manner from a sensor, for example the steering wheel, via a control circuit (e.g., a processor or control unit) to the electromechanical actuator that executes the steering command. In a system of this kind, there is no mechanical connection between the steering wheel and the steered wheels.

"Autonomous driving", also known as "automatic driving" or, alternatively, "automated driving", in the context of the present teachings is understood as locomotion of vehicles and driverless transport systems. The degree of automation is often represented by the following levels. Level 0: No automation. The driver steers, accelerates and brakes themselves. Level 1: The car has individual supporting systems such as an anti-lock braking system (ABS) or an electronic stability program (ESP), which intervene automatically. Level 2: Automated systems take over subtasks (for example adaptive cruise control, lane change assistant, automatic emergency braking). However, the driver retains sovereignty over the vehicle as well as responsibility. Level 3: The car may accelerate, brake and steer at certain times independently (conditional automation). If necessary, the system requests the driver to take over control. Level 4: In normal operation, the vehicle may drive in a fully autonomous manner. However, the driver has the option to intervene and to "override" the system. Level 5: Fully automated, autonomous operation of the vehicle without the possibility of (and need for) intervention on the part of the driver.

The head-up display (HUD) is a display system in which the user may maintain their viewing direction and therefore their head angle because the information is projected into their field of view. In addition to pilots, automobile drivers, inter alia, are included amongst the users. For example, augmented reality (AR) may be combined with a HUD. AR means a computer-assisted expansion of the perception of reality. This information may be compatible with any human sensory modality. Frequently, however, augmented reality is only understood to mean the visual depiction of information, i.e., the addition of images or videos with computer-generated additional information on virtual objects by means of inserting/overlaying.

"Car-to-Car Communication"—"Car2Car", "C2C" or "vehicle2vehicle"—"V2V"—refers to the exchange of information and data between motor vehicles in order to report critical and dangerous situations to the driver in good time. "Car2Car" is a special case of "Car2X"—also known as "V2X"—for communication between vehicles and their surroundings, in addition to other road users, for example, the infrastructure.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

Figure 1:
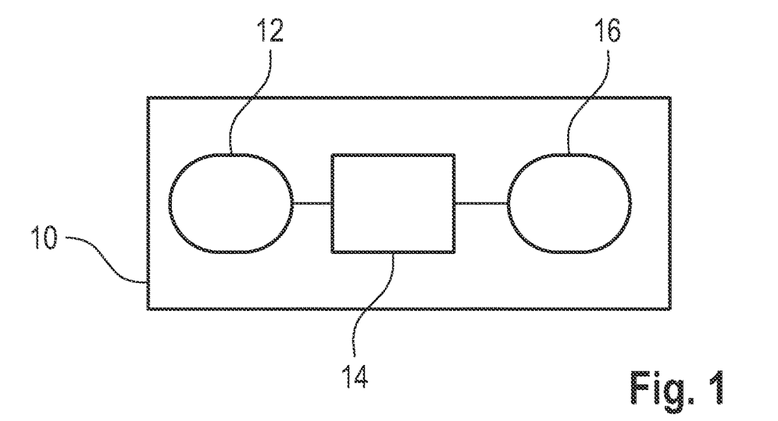
FIG. 1 shows a schematic depiction of an embodiment of a device for recognizing an intention of a driver for a lane change assistant in an at least partially autonomous motor vehicle.

FIG. 1 shows a schematic depiction of a device 10 for recognizing an intention of a driver for a lane change assistant in an at least partially autonomous motor vehicle. The device 10 comprises an input interface 12, an analysis circuit 14 and an output interface 16.

The input interface 12 is designed to receive data comprising sensor data with information on a section of a roadway in the surroundings of the motor vehicle and control data with information on a control input of a driver of the motor vehicle. The data may, for example, comprise positions and speeds of motor vehicles in the surroundings of the ego motor vehicle, recognized traffic signs and/or a navigation hint, and come from, for example, a speedometer, GPS receiver, a radar sensor, laser sensor or lidar sensor, a camera and/or navigation system. For receiving, the input interface 12 is for example connected to a vehicle-internal transmission network. Furthermore, the input interface 12 may also be designed for wireless communication or be connected to a proprietary, e.g., wired transmission network.

The analysis circuit 14 is designed to receive the data and to generate a control command, wherein the control command prompts a control procedure of the motor vehicle with a vehicle unit in the form of a driver assistance system based on the control input of the driver and prompts depiction of a notice relating to the control procedure of the motor vehicle with a vehicle unit in the form of a display device. The control input corresponds to a control input during manual driving at least in sections. The analysis circuit 14 determines a traffic situation in the surroundings of the motor vehicle based on the sensor data. It should be understood that the analysis circuit 14 may also receive and use a traffic situation already determined by the driver assistance system or another system.

The output interface 16 is designed to transmit the control command to a vehicle unit of the motor vehicle, wherein the vehicle unit may, for example, comprise a display device and/or a driver assistance system. The output interface 16 may be designed analogously to the input interface 12 for communicating. Of course, the input interface 12 and the output interface 16 may also be designed so as to be combined as a communication interface for sending and receiving.

Figure 2:
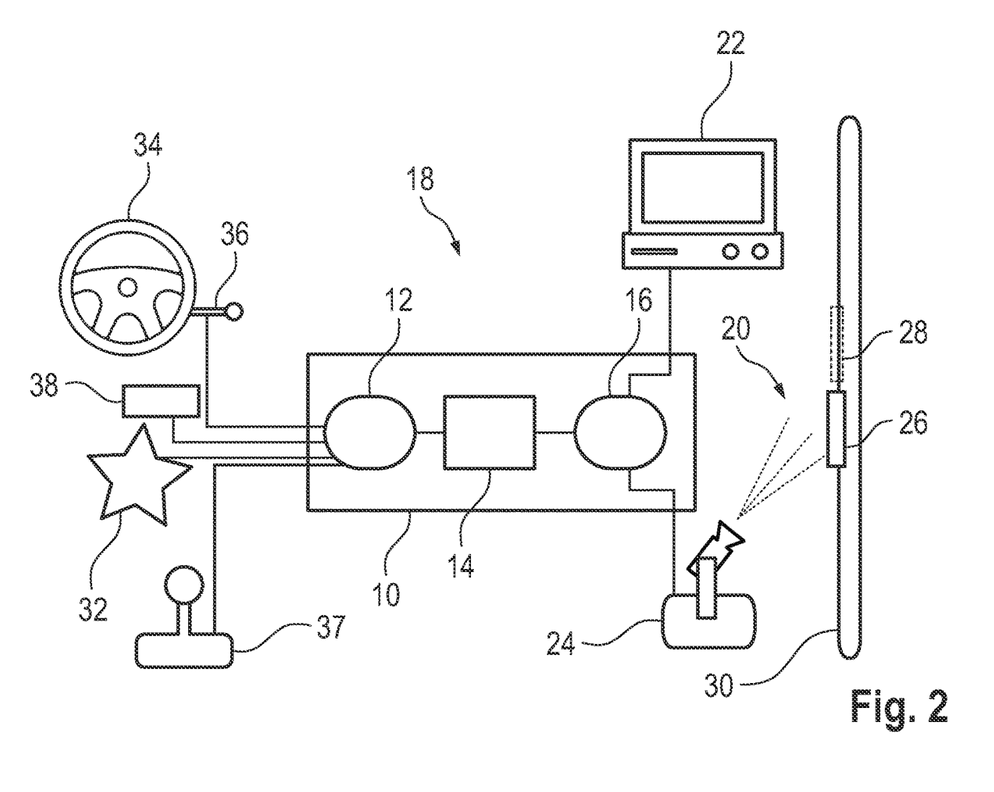
FIG. 2 shows a schematic depiction of a system according to an embodiment.

FIG. 2 shows a schematic depiction of a system 18 with a device 10, an AR display device 20 and a driver assistance system 22.

As described above, the device 10 receives data comprising sensor data and control data.

Based on the data, the device 10 creates a control command for the AR display device 20 and thereby prompts depiction of a notice 26, relating to a control procedure of the motor vehicle to be performed, on a front windshield 30 of the motor vehicle. In the example shown, the AR display device 20 comprises a head-up display, wherein a projection unit 24 is designed to be movable and, for example, may be moved by actuators so that the notice 26 may be projected onto the front windshield 30 at a position in the field of view of the driver. For example, a size, position and shape of the notice 26 may be varied. This allows the notice 26 to be directly displayed on the front windshield 30 of the motor vehicle. Furthermore, another notice 28 that for example marks the current actual position, i.e., for example a current travel lane being traveled on, may be displayed.

The sensor data may come from a sensor 32 that comprises, for example, a speedometer, a GPS receiver, a radar sensor, laser sensor, lidar sensor or a camera.

The control data may, for example, come from a steering wheel 34, a turn signal lever 36, a joystick 37 and/or a navigation system 38. It should be understood that actuation of the turn signal lever 36, joystick 37 and/or actuation of the steering wheel 34 may be detected by means of corresponding switches and sensors 32, as is known in principle in the prior art. If a control procedure imitated by the driver, for example a rotation of the steering wheel 34, is recognized, the analysis circuit 14 may transmit a control command to the driver assistance system that comprises, for example, the information "Change lane left". Then, the driver assistance system 22 may calculate and perform a corresponding control procedure for the motor vehicle.

Figure 3:
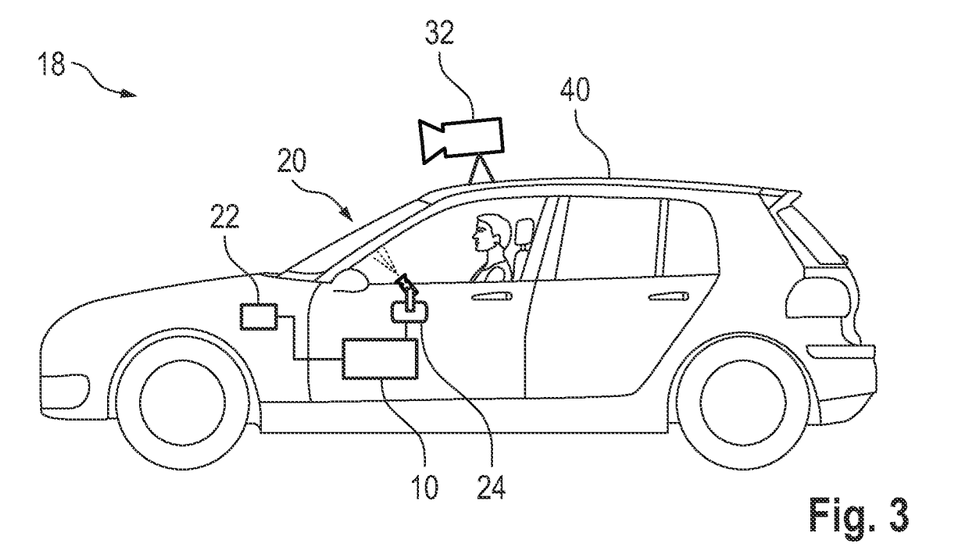
FIG. 3 shows a schematic depiction of another embodiment of a system in a motor vehicle.

FIG. 3 shows a schematic depiction of a variant of the system 18 in a motor vehicle 40. The system 18 comprises a device 10, an AR display device 20 and a driver assistance system 22. In the example shown, the AR display device 20 comprises a projection unit 24 that may project onto the front windshield 30 (not shown in greater detail) of the motor vehicle 40.

As described above, the device 10 receives data comprising sensor data and control data. In the example shown, the sensor 32 comprises a front camera. It should be understood that other sensors 32 are also conceivable. For example, data from multiple sensors 32 may be fused to achieve a higher data quality.

The device 10 analyzes the received data and determines a control command, which prompts depiction of a notice 26 and/or another notice 28, wherein a control procedure of the motor vehicle 40 to be performed may be conveyed using the other notice 28. For example, the other notice 28 may mark a travel lane, wherein the control procedure to be performed comprises a change of travel lane. For example, the other notice 28 may be adapted, for example in real time, in response to a control input of the driver. For example, a rotation of the steering wheel 34 may directly prompt a shift of the other notice 28 to another travel lane. For example, the proposed driving maneuver, i.e., the control procedure of the motor vehicle 40 to be performed, is confirmed by the driver and then performed by the driver assistance system 22.

FIGS. 4a to 8c schematically depict outputs 42 of the system 18 from the perspective of the driver. For clarity reasons, only one notice icon has been used for the notices 26, 28 and only one notice 26, 28 is displayed in each case. It should be understood that parallel depiction of both notices 26, 28 is also conceivable. Furthermore, a steering wheel 34 has been depicted as an example of an input medium for generating control data.

Figure 4A:
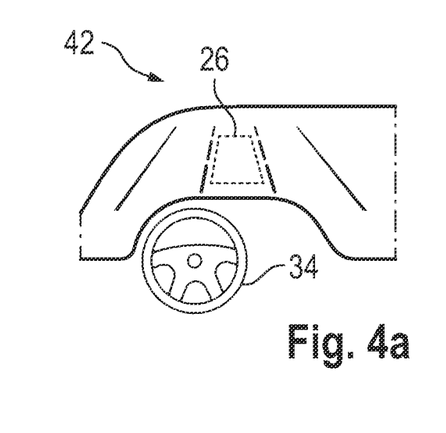
FIGS. 4a to 4c show example schematic depictions of outputs of the system from the perspective of the driver.

FIG. 4a shows a situation in which the motor vehicle 40 is traveling on a central travel lane of a multi-lane road. Said travel lane currently being traveled on is marked by means of the notice 26.

The driver has the option of marking an adjacent driving lane by moving, for example, the steering wheel 34 or the turn signal lever 36.

Figure 4B:
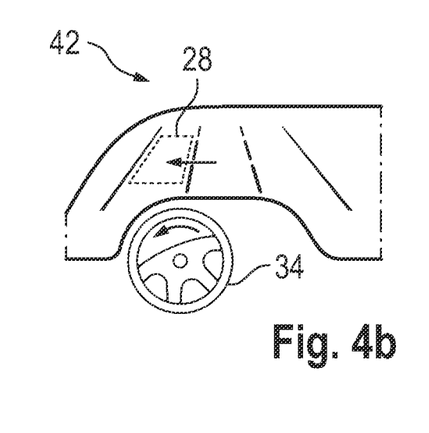
Figure 4C:
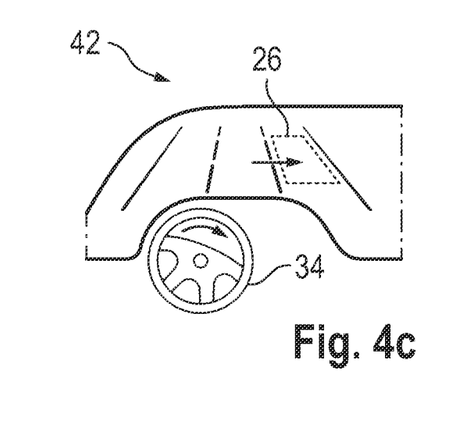

In FIG. 4b, the left-hand travel lane is marked and, in FIG. 4c, the right-hand travel lane is marked.

Longitudinal and lateral control of the motor vehicle 40 are monitored by the driver assistance system 22 of the motor vehicle 40. The motor vehicle 40 is aware of what vehicles are located in its immediate surroundings based on its environment model. Said environment model is kept up-to-date by means of the vehicle's own sensors and via V2X. The motor vehicle 40 may optionally also make cooperative agreements with vehicles in the surroundings via V2X. Based on this, the motor vehicle 40 initiates the lane change independently.

Figure 5A:
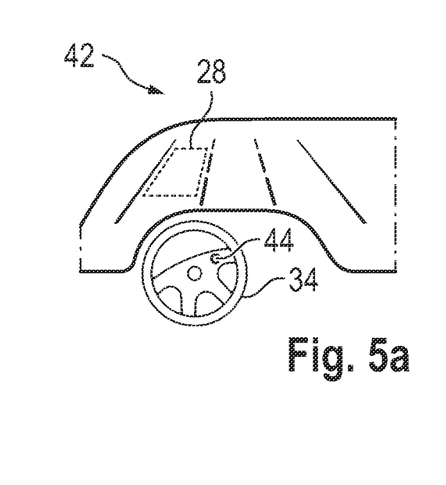
FIGS. 5a to 5c show additional example schematic depictions of outputs of the system from the perspective of the driver.

FIG. 5a shows a variant in which the driver has the option to confirm their selection with the press of a button by actuating a confirmation switch 44.

Figure 5B:
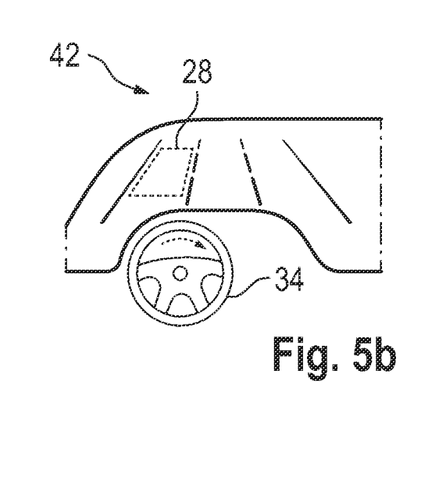

If the driver confirms the control procedure to be performed, the steering wheel 34 may be released, as shown in FIG. 5b, so that the steering wheel 34 for example returns to the original position. Optionally, the driver may generate abort data in order to abort the maneuver. This may, for example, occur by means of a counter-rotation of the steering wheel 34 or other haptic or acoustic signals, such as a spoken command, for example "Stop!", "Back!", "No!". It should be understood that other input options are also conceivable. Once the lane change maneuver is complete, the driver may optionally be informed of the successful lane change by means of acoustic, visual and/or haptic signals, for example.

Figure 5C:
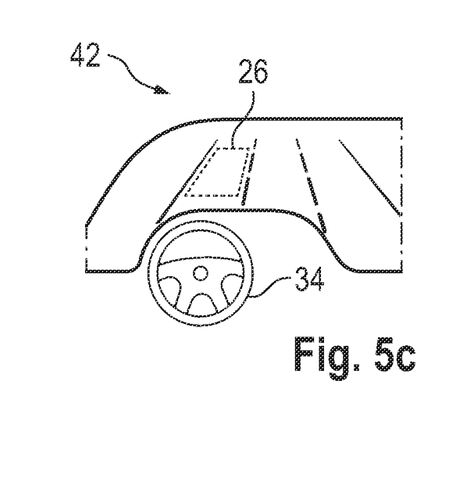

FIG. 5c shows a situation in which the motor vehicle 40 has performed the lane change and is traveling on the left-hand travel lane of a multi-lane road. The left-hand travel lane currently being traveled on is displayed by means of the notice 26. It should be understood that the notice 26 is optional.

Figure 6A:
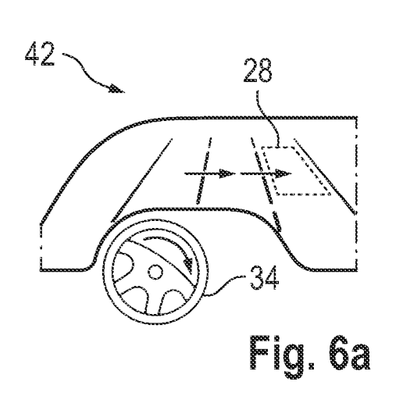
FIGS. 6a to 6b show additional example schematic depictions of outputs of the system from the perspective of the driver.

FIG. 6a depicts a starting situation in which the driver would like to perform a lane change over multiple travel lanes. An alternative example of a starting example would, for example, be a bus that is located in the bay of a bus stop and must turn off left immediately afterwards. For this purpose, multiple travel lanes would have to be crossed within a short distance. In the example shown, by moving the steering wheel 34, the driver has selected the travel lane to which the motor vehicle 40 is to maneuver. The device 10 has marked this travel lane using the other notice 28. In this connection, the marking may be applied to the desired travel lane depending on the duration and/or magnitude of the steering wheel deflection.

Figure 6B:
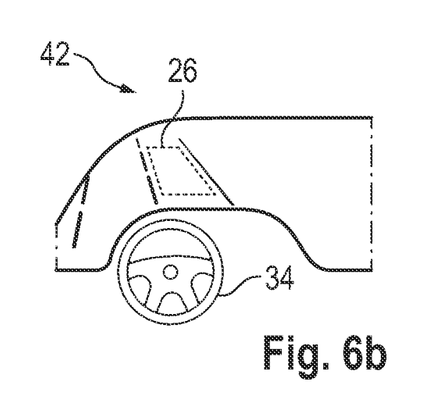

FIG. 6b shows a situation in which the motor vehicle 40 has performed the lane change over multiple travel lanes and is traveling on the right-hand travel lane of a multi-lane road. The right-hand travel lane currently being traveled on is displayed by means of the notice 26. The change takes place over multiple travel lanes, analogously to the above-described change of travel lane.

Figure 7A:
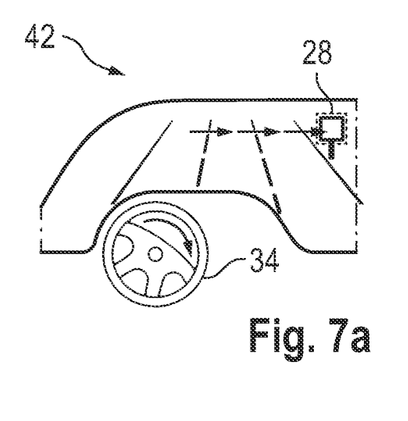
FIGS. 7a to 7b show additional example schematic depictions of outputs of the system from the perspective of the driver.

FIG. 7a shows a starting situation for traveling on a left-hand or central travel lane, for example. The driver would like to leave the road at an off-ramp or junction. For this purpose, said driver marks the turn-off lane using the steering wheel 34 and thus alerts the motor vehicle 40 of his wish to turn off. In terms of procedure, this corresponds to the application scenario already described with respect to FIGS. 6a and 6b. Alternatively, the driver may also mark a sign at the edge of the road and thus alerts the motor vehicle 40 and especially the system 18 as to which exit or junction they would like to take. "Mark" should, for example, be understood to mean moving the other notice 28 by means of a deflection of the steering, as described above.

The driver marks a sign at the edge of the road by moving the steering wheel 34. The position and message of the sign is known to the motor vehicle 40, either because the information is already stored in the navigation system or environment model, for example, or because the information was received from another motor vehicle with road sign recognition via V2X or because the information itself was obtained via text recognition from the sign. The motor vehicle 40 and, for example, the system 18 may recognize the sign as such, record its information, and obtain the intention of the driver via the steering wheel input. The system 18 for example knows the road topology and/or road geometry and, consequently, also knows the exact location of the exit or, alternatively, junction. It should be understood that the system 18 may access navigation data for this purpose.

The motor vehicle 40 performs the required changes of travel lane to the exit independently. Consequently, the motor vehicle 40 runs through the same states as in the previous sections until the changes of travel lane are complete.

Figure 7B:
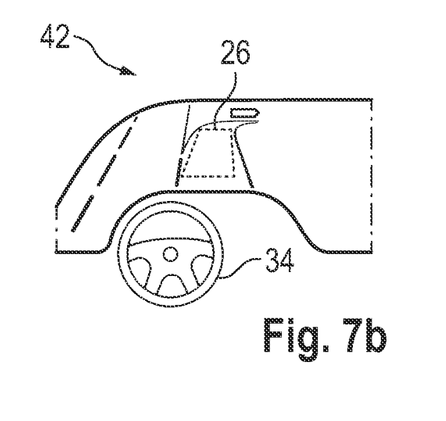

FIG. 7b shows a situation in which the motor vehicle 40 has performed the lane change over multiple travel lanes and is traveling on an off-ramp in order to leave a freeway or highway. The off-ramp currently being traveled on is displayed by means of the notice 26.

Figure 8A:
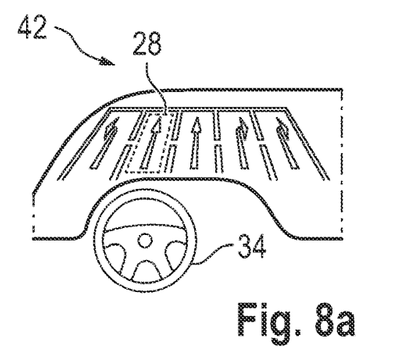
FIGS. 8a to 8c show additional example schematic depictions of outputs of the system from the perspective of the driver.

FIG. 8a depicts a starting situation in which an intersection, for example, is being approached on the central travel lane, for example. The intersection has, for example, multiple directional travel lanes and, in the example shown, comprises a left-turn lane, two straight-ahead lanes, and two right-turn lanes.

Figure 8B:
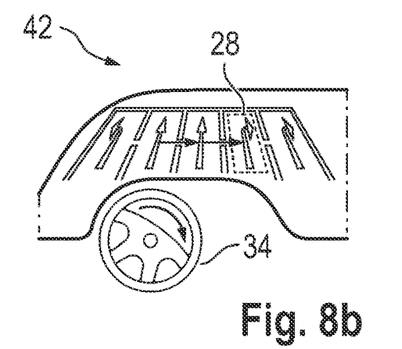

FIG. 8b shows a situation in which the driver has marked their desired directional travel lane or, alternatively, their desired turn-off lane by moving the steering wheel 34, as described above. In the example shown, the right-turn lane on the left is marked.

The travel lane topology of the intersection is known to the motor vehicle 40 and, for example, to the system 18, either because the information is already stored in the navigation system or environment model, for example, or because the information was received from another vehicle with travel lane recognition via V2X or because the information itself was obtained via travel lane recognition.

It should be understood that information on the road topology and/or geometry may be received from a sending apparatus at the intersection, for example a set of traffic lights or the like.

The motor vehicle 40 performs the required changes of travel lane to the intersection independently. Consequently, the motor vehicle 40 runs through the same states as described in the previous sections.

Figure 8C:
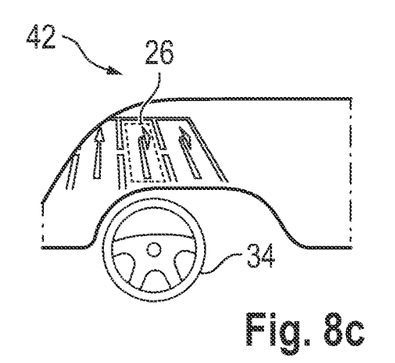

FIG. 8c shows the situation after the move-in maneuver independently performed by the motor vehicle 40 has been completed. The motor vehicle 40 is traveling on the right-turn lane on the left. The right-turn lane currently being traveled on is displayed by means of the notice 26.

FIGS. 4a to 8c show a steering wheel 34 as an example of a medium for generating the control data. It should be understood that the steering wheel 34 has merely been used as an example of a known input medium in order to discuss and that this example use of the steering wheel 34 should in no way be understood to be limiting. Other input devices, for example one or two joysticks 37 or a turn signal lever 36, are also conceivable, as already explained above. It should be understood that the confirmation switch 44, if provided, is for example arranged on the corresponding input medium.

Figure 9:
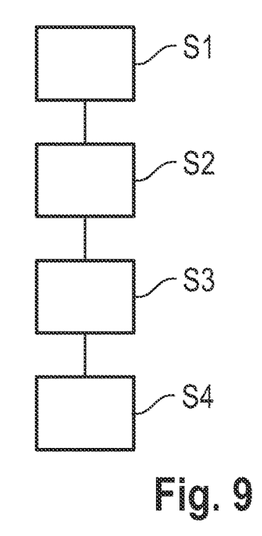
FIG. 9 shows a schematic depiction of the steps of a method according to an embodiment.

FIG. 9 schematically shows the steps of a method according to an embodiment for recognizing an intention of a driver for a lane change assistant in an at least partially autonomous motor vehicle 40. The method may for example be executed by a system 18 and/or a device 10 as described above.

In a first step S1, sensor data with information on a section of a roadway in the surroundings of the motor vehicle 40 and control data with information on a control input of a driver of the motor vehicle 40 are received.

In a second step S2, a traffic situation in the surroundings of the motor vehicle 40 is determined based on the sensor data.

In a third step S3, a control command is generated based on the control data in order to control a vehicle unit of the motor vehicle 40.

In a fourth step S4, the control command is finally transmitted to the vehicle unit of the motor vehicle 40.

The control command prompts a control procedure of the motor vehicle with a vehicle unit in the form of a driver assistance system 22 based on the control input of the driver and prompts depiction of another notice 28 relating to the control procedure of the motor vehicle 40 with a vehicle unit in the form of a display device. The control input corresponds to a control input during manual driving at least in sections.

The invention has been described in detail. The chosen embodiments were only chosen by way of example to improve understanding of the invention. A person skilled in the art will recognize that various variations are possible.

For example, it is possible to operate the invention in an application with several notice icons. For example, the following benefits may be achieved: The classic control elements, such as the steering wheel 34, turn signal lever 36, and/or head-up display, may be used for new driving functions and/or for inputting tactical driving commands. Furthermore, an intuitive operating concept may be created for inputting tactical driving commands.

LIST OF REFERENCE NUMERALS

10 Device
12 Input interface
14 Analysis circuit
16 Output interface
18 System
20 Augmented reality/AR display device
22 Driver assistance system
24 Projection unit
26 Notice
28 Other notice
30 Front windshield 32 Sensor
34 Steering wheel
36 Turn signal lever
37 Joystick
38 Navigation system
40 Motor vehicle
42 Output
44 Confirmation switch
S1-S4 Method steps The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A device for recognizing an intention of a driver of an at least partially autonomous motor vehicle, comprising:
    a conventional control element, configured to control a movement of the vehicle during manual driving by an occupant of the motor vehicle and additionally, to provide a control input request of the occupant during at least partially autonomous driving;
    an input interface for receiving sensor data with information on a section of a roadway in the surroundings of the motor vehicle and control data from the conventional control element with information on the control input request;
    an analysis circuit for determining a traffic situation in the surroundings of the motor vehicle based on the sensor data and for generating a vehicle control command based on the control data in order to control the motor vehicle, wherein the analysis circuit is configured to determine, whether the traffic situation allows a vehicle control in accordance with the control input request, so that the vehicle control command is selectively provided if the traffic situation permits it; and
    an output interface for selectively transmitting the vehicle control command to the motor vehicle; wherein
    the vehicle control command prompts a control procedure of the motor vehicle by a driver assistance system based on the control input request of the occupant and prompts depiction of a notice relating to the control procedure of the motor vehicle by a display device; and wherein
    the control input request corresponds at least partially to a control input that the occupant would use during manual driving.

2. The device of claim 1, wherein the output interface is configured to transmit the vehicle control command to one or more of an AR display device and an AR head-up display (HUD).

3. The device of claim 2, wherein the display device is for part of one or more of an onboard computer, infotainment system, and navigation system.

4. The device of claim 2, wherein the analysis circuit is configured to determine the vehicle control command that prompts depiction of a notice for displaying a travel lane traveled on by the motor vehicle.

5. The device of claim 2, wherein the conventional control element comprises one or more of a steering wheel, turn signal lever, joystick, and actuation switch; and the control procedure comprises one or more of turning and changing a lane.

6. The device of claim 2, wherein the analysis circuit determines the vehicle control command that, in response to the control input request, prompts depiction of another notice with information on a control procedure to be performed by the driver assistance system.

7. The device of claim 1, wherein the analysis circuit is configured to determine the vehicle control command that prompts depiction of a notice for displaying a travel lane traveled on by the motor vehicle.

8. The device of claim 7, wherein the conventional control element comprises one or more of a steering wheel, turn signal lever, joystick, and actuation switch; and the control procedure comprises one or more of turning and changing a lane.

9. The device of claim 7, wherein the analysis circuit determines the vehicle control command that, in response to the control input request, prompts depiction of another notice with information on a control procedure to be performed by the driver assistance system.

10. The device of claim 1, wherein the conventional control element comprises one or more of a steering wheel, turn signal lever, joystick, and actuation switch; and the control procedure comprises one or more of turning and changing a lane.

11. The device of claim 10, wherein the analysis circuit determines the vehicle control command that, in response to the control input request, prompts depiction of another notice with information on a control procedure to be performed by the driver assistance system.

12. The device of claim 1, wherein the analysis circuit determines the vehicle control command that, in response to the control input request, prompts depiction of another notice with information on a control procedure to be performed by the driver assistance system.

13. The device of claim 1, wherein the input interface is configured to receive control data that comprise a confirmation from a confirmation switch of the control procedure to be performed by the driver assistance system, wherein the vehicle control command prompts the control procedure to be performed after the confirmation has been received.

14. The device of claim 1, wherein the input interface is configured to receive control data in the form of abort data with information on cancellation of the control procedure to be performed, wherein the abort data comprise one or more of counter-rotation of the steering wheel, counter-control by means of the joystick, haptic inputs, and acoustic inputs by the driver.

15. The device of claim 1, wherein the analysis circuit is configured to determine the vehicle control command that prompts depiction of a notice for displaying a travel lane traveled on by the motor vehicle by locating the notice using augmented reality.

16. The device of claim 1, wherein the analysis circuit determines the vehicle control command that, in response to the control input request, prompts depiction of another notice with information on a control procedure to be performed by the driver assistance system by locating the another notice using augmented reality.

17. The device of claim 1, wherein the control procedure comprises one or more of turning and changing a lane.

18. A system for recognizing an intention of a driver of an at least partially autonomous motor vehicle, comprising:
a device for recognizing an intention of a driver of an at least partially autonomous motor vehicle, the device comprising:
a conventional control element, configured to control a movement of the vehicle during manual driving by an occupant of the motor vehicle and additionally, to provide a control input request of the occupant during at least partially autonomous driving;
an input interface for receiving sensor data with information on a section of a roadway in the surroundings of the motor vehicle and control data from the conventional control element with information on the control input request;
an analysis circuit for determining a traffic situation in the surroundings of the motor vehicle based on the sensor data and for generating a vehicle control command based on the control data in order to control the motor vehicle, wherein the analysis circuit is configured to determine, whether the traffic situation allows a vehicle control in accordance with the control input request, so that the vehicle control command is selectively provided if the traffic situation permits it; and
an output interface for selectively transmitting the vehicle control command to the motor vehicle; wherein
the vehicle control command prompts a control procedure of the motor vehicle by a driver assistance system based on the control input request of the occupant and prompts depiction of a notice relating to the control procedure of the motor vehicle by a display device; and
the control input request corresponds at least partially to a control input that the occupant would use during manual driving;
one or more of an AR display device and a head-up display for outputting a notice and/or another notice in response to the vehicle control command of the device; and
a driver assistance system for controlling the motor vehicle in response to the vehicle control command.

19. A method for recognizing an intention of a driver of an at least partially autonomous motor vehicle, comprising:
receiving sensor data with information on a section of a roadway in the surroundings of the motor vehicle;
receiving control data with information on a control input request of an occupant of the motor vehicle, which control data is received from a conventional control element, configured to control a movement of the vehicle during manual driving by the occupant and additionally, to provide the control input request during at least partially autonomous driving;
determining a traffic situation in the surroundings of the motor vehicle based on the sensor data;
determining, whether the traffic situation allows a vehicle control in accordance with the control input request;
selectively generating a vehicle control command to control the motor vehicle based on the control data, if the traffic situation permits it; and
selectively transmitting the control command to the motor vehicle,
wherein the vehicle control command prompts a control procedure of the motor vehicle by a driver assistance system based on the control input request and prompts depiction of a notice relating to the control procedure of the motor vehicle by a display device; and wherein
the control input request corresponds at least partially to a control input that the occupant would use during manual driving.

20. A non-transitory storage medium with instructions that, when executed on a computer or processor, cause the computer or processor to:
receive sensor data with information on a section of a roadway in the surroundings of the motor vehicle;
receive control data with information on a control input request of an occupant of the motor vehicle, which control data is received from a conventional control element, configured to control a movement of the vehicle during manual driving by the occupant and additionally, to provide the control input request during at least partially autonomous driving;
determine a traffic situation in the surroundings of the motor vehicle based on the sensor data;
determine, whether the traffic situation allows a vehicle control in accordance with the control input request;
selectively generate a vehicle control command to control the motor vehicle based on the control data, if the traffic situation permits it; and
selectively transmit the control command to the motor vehicle,
wherein the vehicle control command prompts a control procedure of the motor vehicle by a driver assistance system based on the control input request and prompts depiction of a notice relating to the control procedure of the motor vehicle by a display device; and wherein
the control input request corresponds at least partially to a control input that the occupant would use during manual driving.

* * * * *